United States Patent [19]

Vincent et al.

[11] 3,946,120

[45] Mar. 23, 1976

[54] HIGH PROTEIN BREAD SUBSTITUTE AND METHOD FOR PREPARING SAME

[75] Inventors: William Vincent, Dorset; Hartmut Zeller, Grand-Lancy, both of Switzerland

[73] Assignee: Wander Ltd., Bern, Switzerland

[22] Filed: May 22, 1974

[21] Appl. No.: 472,163

Related U.S. Application Data

[63] Continuation-in-part of Ser. No. 460,649, April 12, 1974, abandoned.

[30] Foreign Application Priority Data

Apr. 16, 1973 Switzerland.......................... 5409/73

[52] U.S. Cl. ................ 426/532; 426/585; 426/657; 426/810
[51] Int. Cl.² ..................... A21D 8/00; A21D 10/00
[58] Field of Search ........... 426/146, 152, 153, 189, 426/196, 201, 343, 345, 359, 363, 804, 810, 532, 585, 654, 657, 658

[56] References Cited

UNITED STATES PATENTS

| | | | |
|---|---|---|---|
| 3,185,574 | 5/1965 | Gabby et al. | 426/152 |
| 3,697,290 | 10/1972 | Lynn | 426/153 |

*Primary Examiner*—A. Louis Monacell
*Assistant Examiner*—R. A. Yoncoskie
*Attorney, Agent, or Firm*—Gerald D. Sharkin; Robert S. Honor; Thomas O. McGovern

[57] ABSTRACT

The present invention concerns a novel low starch high protein bread substitute obtained by baking a water-containing dough comprising at least 15% by weight of milk protein, at least 1% by weight egg protein, at least 10% by weight lipids and at least 30% by weight carbohydrates wherein at least 50% by weight of the carbohydrates are derived from milk.

25 Claims, No Drawings

HIGH PROTEIN BREAD SUBSTITUTE AND METHOD FOR PREPARING SAME

This application is a continuation-in-part of U.S. Pat. Application Ser. No. 460,649, filed Apr. 12, 1974, now abandoned.

The present invention relates to low-starch protein-rich foodstuffs.

The present invention provides a low starch high protein bread substitute obtained by baking a water-containing dough comprising at least 15% by weight of milk protein, at least 1% by weight egg protein, at least 10% by weight lipids and at least 30% by weight carbohydrates wherein at least 50% by weight of the carbohydrates are derived from milk.

By the term "bread substitute" is meant a foodstuff resembling bread or other bakery products derived wholly or largely from grain flour, e.g. rolls, biscuits and buns, in appearance, texture and taste, yet different to such products in having a lower or no starch or similar polysaccharide content and a high protein content.

The bread substitute of the present invention may be produced by stirring the water-containing dough vigorously to aerate the dough and heating the dough to a temperature between 140° and 180°C in an oven until a spongy product having an external crust is obtained.

Preferred components of the water-containing dough are, aside from water, powdered defatted milk to provide the milk protein and also the milk carbohydrates, egg white in fresh or powder form to provide the egg protein, at least one sugar to provide the balance of the carbohydrate, for example sucrose, glucose and fructose, and at least one oil, for example vegetable oils such as palm oil, sunflower oil, coconut oil and peanut oil, or fat, for example butter, to provide the lipids.

Furthermore, adjuvants may be added to the dough, for example, flavouring agents such as lecithin, potassium sorbate and common salt, and gelatinizing agents such as sea moss extracts, especially carrageen and sulphuric acid esters of polyoses especially polygalactose sulphuric acid ester. Other adjuvants may be incorporated as desired for example to stabilize the structure of the baked product and to improve the keeping quality thereof.

When a sugar is employed as the balance of the carbohydrate, this is preferably sucrose, glucose or fructose, either alone or in admixture.

When butter is used to provide the lipid content of the product, it is preferable to use that amount of butter corresponding to at least 5% by weight of unskimmed milk with 25% by weight of fat in the final product. As will be appreciated, the butter may also be used to augment the milk protein and milk carbohydrate content of the final product.

The appropriate method for the production of the dough is determined by the particular proportions of the various components.

For example, the production may be effected as follows:

I. Separate production of a mixture A from milk powder, fat and lecithin by adding the latter two components in melted state to the dry powdered milk, and of a solution B from sugar and the soluble adjuvants in water, subsequent mixing of the solution B with fresh egg white and addition of mixture A to the resulting liquid and, finally, vigorous beating of the whole mass in order to assure a sufficient take-up of air in the dough.

II. Production of solution B, addition of the melted fat and lecithin to this solution and homogenization, mixing of the resulting liquid with the fresh egg white and the powdered milk, and vigorous beating of the whole mass.

III. Production of solution B, addition of the fresh egg white to this solution, mixing of the resulting liquid, addition of the powdered milk to the liquid, vigorous beating of the resulting liquid dough and subsequent addition of the melted fat and lecithin to the dough, and beating of the final product.

IV. Production of suspension C from fat and lecithin in water in the presence of the sugar and the further water-soluble adjuvants, and homogenization of this suspension, addition of the fresh egg white to the homogenized suspension, subsequent thorough mixing and optionally thorough beating, and, finally, addition of the powdered milk to the mixture and thorough beating of the resulting final product.

V. Production of a solution B, addition of the previously whipped egg white to this solution, beating of the resulting mixture and subsequent addition of the melted fat and lecithin, thorough stirring of the mixture once more, addition of the powdered milk and beating of the whole mass.

VI. Production of a solution B, addition of the fresh egg white by mixing and beating of the resulting mass, addition of the melted fat and lecithin, vigorous beating and, subsequently, addition of the powdered milk and beating of the final product.

VII. Production of a solution of the water-soluble adjuvants in water, addition of the previously whipped fresh egg white to the solution, stirring of the mixture and addition of the melted fat and lecithin, stirring once more and addition of the sugar to the resulting mixture, stirring of the mixture and addition of the powdered milk and, finally, beating of the entire mass.

Method number VI generally permits the production of a dough having the most convenient consistency for the production of a spongy final product after baking, the structure thereof coming nearest to that of fresh bread.

After the final thorough beating of the dough, the latter is preferably formed immediately and rapidly into the desired forms. Actually, a certain hardening of the dry dough in the cold may be observed, this being very pronounced already after a few minutes.

The baking of the dough may be effected in known manner, e.g. in an oven or using a microwave heating apparatus.

The optimum baking temperature is about 150° – 160°C. The optimum baking time is inversely proportional to the baking temperature. At a baking temperature between 150° and 160°C the baking time is between 15 and 40 minutes, preferably between 20 and 25 minutes.

The product obtained after baking has a water content of 15–18 % by weight and its spongy structure resembles that of fresh bread. When packed in a tight wrapping under aseptic conditions, the product remains unchanged for several weeks, but its texture continues developing in the course of time and after about 14 days it loses the structure of fresh bread and takes the structure of pound-cake or biscuits.

The change in texture of the product largely depends on the kind of sugar used for production.

In this respect, the best results are obtained with the use of pure sucrose. The use of pure fructose leads to a product which does not keep so well when stored, and the use of pure glucose or mixtures of at least two of the above indicated sugars leads to a product having keeping qualities between those obtained with the use of the above first mentioned sugars.

In order to improve the keeping properties of the product, the water content of the same may be reduced, after baking, to about 6 % by weight. This may, for example, be effected by keeping the product in a drying chamber for about 3 hours at a temperature between 50° and 60°C. The so treated product, packed in a tight wrapping, keeps unchanged in taste and consistency for several months.

EXAMPLES 1 to 9

Homogeneous, water-containing doughs are produced by mixing the components indicated in the following Table (this Table indicates the amounts of the components in per cent by weight, calculated on the total weight of the dough).

resulting air-containing mass. During this process having a duration of 15 seconds, beating of the mixture is continued, whereby the stirrer is adjusted to speed 3. Beating is subsequently continued for 15 seconds at speed 3. Without interrupting stirring, but reducing the speed of the stirrer to speed 2, the milk powder is added to the mixture within 15 seconds. The whole material is then thoroughly beaten for a further 15 seconds at speed 3. The dough is subsequently allowed to collapse for 5 seconds and is then beaten for 30 seconds at speed 3, stirring is again interrupted for 5 seconds and the dough is again beaten for 15 seconds at speed 3.

Immediately after the last beating the dough is poured into small buttered boat-form moulds. Approximately 100 g of dough are placed in each mould. These moulds are placed in an oven preheated to 155°C and the dough is baked for 22 minutes.

In the case of Examples 4 to 8, the process is effected as described above, except that the mixture of components is treated as follows up to the addition of the sugar and egg white:

Table 1

| No. of the Example | 1 | 2 | 3 | 4 | 5 | 6 | 7 | 8 | 9 |
|---|---|---|---|---|---|---|---|---|---|
| Components: | | | | | | | | | |
| Powdered defatted milk | 40 | 40 | 40 | 40 | 40 | 40 | 39 | 40 | 43,50 |
| Butter | — | — | — | — | — | — | — | — | 1,90 |
| Water | 6,3 | 6,3 | 6,3 | 6,3 | 6,3 | 6,3 | 6,3 | 6,3 | 6,3 |
| White of egg (1) | 23 | 23 | 23 | 23 | 23 | 23 | 19 | 23 | 23 |
| Sucrose | 15 | 5 | 5 | — | — | 5 | 5 | — | 14 |
| Glucose | — | 10 | — | — | — | — | — | — | — |
| Fructose | — | — | 10 | — | — | — | — | — | — |
| Glucose sirup (2) (3) | — | — | — | 15 | — | 10 | 15 | 7,5 | — |
| Fructose sirup (2) (4) | — | — | — | — | 15 | — | — | 7,5 | — |
| Vegetable fat (5) | 15 | 15 | 15 | 15 | 15 | 15 | 15 | 15 | 10,6 |
| Lecithin | 0,17 | 0,17 | 0,17 | 0,17 | 0,17 | 0,17 | 0,17 | 0,17 | 0,17 |
| Common salt | 0,18 | 0,18 | 0,18 | 0,18 | 0,18 | 0,18 | 0,18 | 0,18 | 0,18 |
| Potassium sorbate | 0,23 | 0,23 | 0,23 | 0,23 | 0,23 | 0,23 | 0,23 | 0,23 | 0,23 |
| Polygalactose sulphuric acid ester (known under the trade name "Aubygel x 52") | 0,12 | 0,12 | 0,12 | 0,12 | 0,12 | 0,12 | 0,12 | 0,12 | 0,12 |

Explanation of Table 1
(1) Corresponding to 2.76% of dry mass.
(2) Percent by weight, calculated on the content of dry mass in the sirup; the corresponding amount of water is included in the percent by weight of water indicated above.
(3) Glucose sirup with a content of 86.5% by weight of dry mass.
(4) Fructose sirup with a content of 70% by weight of dry mass.
(5) Mixture of vegetable oils with the following composition by weight: palm oil = 41.58%, sunflower oil = 42.57%, coconut oil = 14.85%, peanut oil = 1%.

In the case of Examples 1, 2 and 3 the mixing of the components and the manufacturing and baking of the dough are effected as follows:

The potassium sorbate, common salt and sulphuric acid ester of polygalactose are mixed dry.

The resulting powder is dispersed in water at room temperature. The sugar is added to the resulting dispersion and then the egg white is added and the entire material is mixed with a spoon until a homogeneous, liquid dispersion is obtained.

This dispersion is subsequently mixed for 30 seconds with a mixer having a planetary gearing with a stirring speed of 550 revolutions per minute, whereby the axis of the stirrer makes a circular movement in the invert direction at a speed of 135 revolutions per minute (speed 2) for 30 seconds, subsequently at 1200 revolutions per minute for the beater and 300 revolutions per minute for the axis of the stirrer. The dispersion takes up air, increases in volume and takes the appearance of snow.

The fat which has been previously melted by heating to 45°C and the lecithin are subsequently added to the Potassium sorbate, common salt and polygalactose sulphuric acid ester are mixed dry. The resulting powder is dispersed in a quantity of water corresponding to 3.75 g of water calculated on 100 g of total weight of the ready dough (after the addition of all other components). This step of the process is effected at room temperature.

The glucose and/or fructose are dissolved in the amount of water lacking to make up the total water content (or the corresponding sirups are diluted) while heating to 45°C, in order to accelerate the solution of the sugar. The resulting solution is subsequently cooled to room temperature. The dispersion of potassium sorbate, common salt and polygalactose sulphuric acid ester is then mixed at room temperature with the aqueous solution of glucose and/or fructose.

The sucrose (if included in the recipe) and the egg white are added to the above mixture and the entire material is mixed with a spoon until a homogeneous dispersion is obtained.

The subsequent steps are identical with those described above for Examples 1 to 3.

As has already been indicated above, when leaving the oven the resulting products have either a spongy structure analogous to that of fresh bread (Examples 1 to 6), or a finer structure analogous to that of crisp bread (Examples 7 and 8).

The composition of these products is such that their calory value and their proportional content of proteins and carbohydrates are similar to those of powdered whole milk or skim milk, and in some cases are between those of powdered whole milk and those of powdered skim milk.

This is especially so in the case of the product obtained in accordance with Example 9, as indicated in Table 2.

Table 2

|  | Proteins | Lipids | Carbohydrates | Water |
| --- | --- | --- | --- | --- |
| Product obtained in accordance with Example 9 (435 calories/100 g) |  |  |  |  |
| Content in percent by weight | 25,2 | 17 | 49,80[1] | 0[2] |
| Distribution of the calory content in % | 22,3 | 33,7 | 44 |  |
| Powdered whole milk (489 calories/100 g) |  |  |  |  |
| Content in percent by weight | 25,2 | 26,2 | 38,1 | 3,5 |
| Distribution of the calory content in % | 20,7 | 48,2 | 31,1 |  |
| Powdered skim milk (359.5 calories/100 g) |  |  |  |  |
| Content in percent by weight | 36,8 | 0,5 | 52 | 3,5 |
| Distribution of the calory content in % | 40,9 | 1,3 | 57,8 |  |

[1] 62% of this are carbohydrates derived from milk.
[2] In the case of the product obtained in accordance with Example 9 the calculation of the percent by weight is based on the dry content.

As compared with the values in the above Table, normal bread contains in order of value 260 calories per 100 g, and only contains 8 to 9 % by weight (dry substance) of proteins. The content of carbohydrates in normal bread is between 50 and 55 % by weight. It is remarkable that the content of carbohydrates in normal bread is mainly made up of starch, whereas in the foodstuff of the present invention at least half of the carbohydrates (62 % in the case of the product obtained in accordance with Example 9) are derived from milk in the form of lactose.

EXAMPLE 10

The process is effected as described in Example 1, except that the spongy product, obtained after baking the dough, is dried in a drying chamber with increased air circulation for 10 hours at 40°C. A product having a rusk-like structure and a water content of 6 % is obtained. This product has an excellent flavour and melts readily in the mouth. After taking the product out of the drying chamber, it may be kept, packed in a tight wrap, for several months without suffering alterations and maintaining its freshness and its pleasant taste properties.

The foodstuff obtained in accordance with the invention may be used in place of normal bread in the case of diets where no starch or only a small amount of starch should be consumed, especially in the case of slimming diets.

On the other hand, the foodstuff of the present invention may also be used as substitute or supplement for the usual protein rich food-stuffs, e.g. in place of meat. This food is especially valuable for administration in the case of diets on the basis of milk to patients who do not tolerate liquid milk, and also for the nourishment of patients suffering from celiac disease.

In partially dehydrated form, e.g. in accordance with the recipe indicated in Example 10, the foodstuff of the invention has the advantage of combining a high nutritive value with a small volume and low weight. Therefore, it is especially suited for use as emergency provision, e.g. for alpinists and seamen.

What is claimed is:

1. A low-starch, high-protein bread substitute obtained wholly from other than grain flour by baking a water-containing dough aerated by vigorous stirring comprising at least 15 percent by weight of milk protein, at least 1 percent by weight egg protein, at least 10 percent by weight lipids, and at least 30 percent by weight carbohydrates wherein at least 50 percent by weight of the carbohydrates are derived from milk.

2. A bread substitute according to claim 1, devoid of starch in the dough carbohydrate constituent.

3. A bread substitute according to claim 1, wherein the dough milk protein and carbohydrate constituents comprise powdered defatted milk.

4. A bread substitute according to claim 1, wherein the dough egg protein constituent comprises egg white.

5. A bread substitute according to claim 1, wherein the dough lipid constituent comprises a vegetable oil.

6. A bread substitute according to claim 5, wherein the dough lipid constituent comprises one or more of palm oil, sunflower oil, coconut oil and peanut oil.

7. A bread substitute according to claim 1, wherein the dough lipid constituent comprises an animal fat.

8. A bread substitute according to claim 7, wherein the animal fat comprises butter.

9. A bread substitute according to claim 1, wherein the dough carbohydrate constituent, apart from the milk carbohydrates, comprises at least one sugar.

10. A bread substitute according to claim 9, wherein the sugar comprises one or more of sucrose, galactose or fructose.

11. A bread substitute according to claim 1, obtained wholly from other than grain cereal by baking at a temperature of between 140° and 180°C a water-containing dough aerated by vigorous stirring comprising at least 15 percent by weight of milk protein, at least 1 percent by weight egg protein, at least 10 percent by weight lipids, and at least 30 percent by weight carbohydrates wherein at least 50 percent by weight of the carbohydrates are derived from milk.

12. A bread substitute according to claim 1, having a water content in the baked product of between 15 and 18% by weight.

13. A bread substitute according to claim 11, obtained wholly from other than grain cereal by baking at a temperature between 150° and 160°C for a period of 15 to 40 minutes a water-containing dough aerated by vigorous stirring comprising at least 15 percent by weight of milk protein, at least 1 percent by weight egg protein, at least 10 percent by weight lipids, and at least 30 percent by weight carbohydrates wherein at least 50 percent by weight of the carbohydrates are derived from milk.

14. A bread substitute according to claim 1, wherein the water content of the spongy product obtained after baking is reduced, to approximately 6% by weight, in order to obtain a product having a rusk-like structure.

15. A bread substitute according to claim 1 wherein the water-containing dough has the following composition:
    40% by weight of powdered skim milk, 6.3% by weight of water, 23% by weight of fresh hen's egg white having 2.76% by weight of dry mass, 15% by weight of sucrose, 15% by weight of an oil/vegetable fat mixture composed of 41.58% of palm oil, 42.57% of sunflower oil, 14.85% of coconut oil and 1% of peanut oil, 0.17% by weight of lecithin, 0.18% by weight of sodium chloride, 0.23% by weight of potassium sorbate and 0.12% by weight of polygalactose sulphuric acid ester.

16. A bread substitute according to claim 1 wherein the water-containing dough has the following composition:
    40% by weight of powdered skim milk, 6.3% by weight of water, 23% by weight of fresh hen's egg white having 2.76% by weight of dry mass, 5% by weight of sucrose, 10% by weight of glucose, 15% by weight of an oil/vegetable fat mixture composed of 41.58% of palm oil, 42.57% of sunflower oil, 14.85% of coconut oil and 1% peanut oil, 0.17% by weight of lecithin, 0.18% by weight of sodium chloride, 0.23% by weight of potassium sorbate and 0.12% by weight of polygalactose sulphuric acid ester.

17. A bread substitute according to claim 1 wherein the water-containing dough has the following composition:
    40% by weight of powdered skim milk, 6.3% by weight of water, 23% by weight of fresh hen's egg white having 2.76% by weight of dry mass, 5% by weight of sucrose, 10% by weight of fructose, 15% by weight of an oil/vegetable fat mixture composed of 41.58% of palm oil, 42.57% of sunflower oil, 14.85% of coconut oil and 1% of peanut oil, 0.17% by weight of lecithin, 0.18% by weight of sodium chloride, 0.23% by weight of potassium sorbate and 0.12% by weight of polygalactose sulphuric acid ester.

18. A bread substitute according to claim 1, wherein the water-containing dough has the following composition:
    40% by weight of powdered skim milk, 6.3% by weight of water, 23% by weight of fresh hen's egg white having 2.76% by weight of dry mass, 15% by weight of glucose sirup having 86.5% of dry mass, 15% by weight of an oil/vegetable fat mixture composed of 41.58% of palm oil, 42.57% of sunflower oil, 14.85% of coconut oil and 1% of peanut oil, 0.17% by weight of lecithin, 0.18% by weight of sodium chloride, 0.23% by weight of potassium sorbate and 0.12% by weight of polygalactose sulphuric acid ester.

19. A bread substitute according to claim 1, wherein the water-containing dough has the following composition:
    40% by weight of powdered skim milk, 6.3% by weight of water, 23% by weight of fresh hen's egg white having 2.76% by weight of dry mass, 15% by weight of fructose sirup having 70% by weight of dry mass, 15% by weight of an oil/vegetable fat mixture composed of 41.58% of palm oil, 42.57% of sunflower oil, 14.85% of coconut oil and 1% of peanut oil, 0.17% by weight of lecithin, 0.18% by weight of sodium chloride, 0.23% by weight of potassium sorbate and 0.12% by weight of polygalactose sulphuric acid ester.

20. A bread substitute according to claim 1, wherein the water-containing dough has the following composition:
    40% by weight of powdered skim milk, 6.3% by weight of water, 23% by weight of fresh hen's egg white having 2.76% by weight of dry mass, 5% by weight of sucrose, 10% by weight of glucose sirup having 86.5% by weight of dry mass, 15% by weight of an oil/vegetable fat mixture composed of 41.58% of palm oil, 42.57% of sunflower oil, 14.85% of coconut oil and 1% of peanut oil, 0.17% by weight of lecithin, 0.18% by weight of sodium chloride, 0.23% by weight of potassium sorbate and 0.12% by weight of polygalactose sulphuric acid ester.

21. A bread substitute according to claim 1, wherein the water-containing dough has the following composition:
    39% by weight of powdered skim milk, 6.3% by weight of water, 19% by weight of fresh hen's egg white having 2.76% by weight of dry mass, 5% by weight of sucrose, 15% by weight of glucose sirup having 86.5% by weight of dry mass, 15% by weight of an oil/vegetable fat mixture composed of 41.58% of palm oil, 42.57% of sunflower oil, 14.85% of coconut oil and 1% of peanut oil, 0.17% by weight of lecithin, 0.18% by weight of sodium chloride, 0.23% by weight of potassium sorbate and 0.12% by weight of polygalactose sulphuric acid ester.

22. A bread substitute according to claim 1, wherein the water-containing dough has the following composition:
    40% by weight of powdered skim milk, 6.3% by weight of water, 23% by weight of fresh hen's egg white having 2.76% by weight of dry mass, 7.5% by weight of glucose sirup having 86.5% by weight of dry mass, 7.5% by weight of fructose sirup having 70% by weight of dry mass, 15% by weight of an oil/vegetable fat mixture composed of 41.58% of palm oil, 42.57% of sunflower oil, 14.85% of coconut oil and 1% of peanut oil, 0.17% by weight of lecithin, 0.18% by weight of sodium chloride, 0.23% by weight of potassium sorbate and 0.12% by weight of polygalactose sulphuric acid ester.

23. A bread substitute according to claim 1, wherein the water-containing dough has the following composition:

1. 9% by weight of butter, 43.9% by weight of powdered skim milk, 6.3% by weight of water, 23% by weight of fresh hen's egg white having 2.76% by weight of dry mass, 14% by weight of sucrose, 15% by weight of an oil/vegetable fat mixture composed of 41.58% of palm oil, 42.57% of sunflower oil, 14.85% of coconut oil and 1% of peanut oil, 0.17% by weight of lecithin, 0.18% by weight of sodium chloride, 0.23% by weight of potassium sorbate and 0.12% by weight of polygalactose sulphuric acid ester.

24. A process for producing a low-starch, high-protein bread substitute according to claim 1 obtained wholly from other than grain flour, which comprises baking at a temperature between 140° and 180°C. a water-containing dough aerated by vigorous stirring comprising at least 15 percent by weight of milk protein, at least 1 percent by weight egg protein, at least 10 percent by weight lipids, and at least 30 percent by weight carbohydrates wherein at least 50 percent by weight of the carbohydrates are derived from milk.

25. A water containing dough aerated by vigorous stirring suitable for the production of a low-starch, high protein bread substitute obtained wholly from other than grain flour and comprising at least 15 percent by weight of milk protein, at least 1 percent by weight egg protein, at least 10 percent by weight lipids, and at least 30 percent by weight carbohydrates wherein at least 50 percent by weight of the carbohydrates are derived from milk.

* * * * *